US008260307B2

(12) United States Patent
Halfmann et al.

(10) Patent No.: US 8,260,307 B2
(45) Date of Patent: Sep. 4, 2012

(54) METHOD FOR COMMUNICATING IN AN AD-HOC RADIO COMMUNICATION SYSTEM

(75) Inventors: Rüdiger Halfmann, Otterberg (DE); Matthias Lott, Neurled (DE); Michael Meincke, Beckedorf (DE); Egon Schulz, München (DE)

(73) Assignee: Siemens Aktiengesellschaft, Munich (DE)

( * ) Notice: Subject to any disclaimer, the term of this patent is extended or adjusted under 35 U.S.C. 154(b) by 767 days.

(21) Appl. No.: 10/573,246

(22) PCT Filed: Sep. 13, 2004

(86) PCT No.: PCT/EP2004/052149
§ 371 (c)(1),
(2), (4) Date: Mar. 23, 2006

(87) PCT Pub. No.: WO2005/032055
PCT Pub. Date: Apr. 7, 2005

(65) Prior Publication Data
US 2007/0010199 A1    Jan. 11, 2007

(30) Foreign Application Priority Data
Sep. 24, 2003  (DE) .................. 103 44 345

(51) Int. Cl.
*H04W 40/00*   (2009.01)
*H04W 72/00*   (2009.01)
*H04W 36/00*   (2009.01)

(52) U.S. Cl. ......... 455/447; 455/443; 455/448; 455/450

(58) Field of Classification Search ................. 455/41.2, 455/443, 444, 447, 448, 450, 452.1, 453
See application file for complete search history.

(56) References Cited

U.S. PATENT DOCUMENTS

| | | | |
|---|---|---|---|
| 5,907,794 A | 5/1999 | Lehmusto et al. | |
| 6,163,680 A | 12/2000 | Bridle et al. | |
| 6,665,521 B1 * | 12/2003 | Gorday et al. | 455/67.11 |
| 6,879,810 B2 * | 4/2005 | Bouet | 455/41.2 |
| 7,027,827 B2 * | 4/2006 | Bonta et al. | 455/502 |

(Continued)

FOREIGN PATENT DOCUMENTS

DE  101 59 262 A1  6/2003

(Continued)

OTHER PUBLICATIONS

ETSI/BRAN "Broadband Radio Access Networks (BRAN); HIPERLAN Type 2 Technical Specification Data Link Control (DLC) Layer; Part 4—Extension for Home Environments", ETSI TS 101 761-4, Jul. 2001. pp. 1-123.

(Continued)

*Primary Examiner* — Un C Cho
(74) *Attorney, Agent, or Firm* — Staas & Halsey LLP

(57) ABSTRACT

Radio stations in a radio communication system send messages from one radio station to another either directly or via one or several radio stations forwarding the messages by using radio resources. The radio resources are allocated in a decentralized manner to radio stations to send the message. At least one radio station sends information about first radio resources used for sending at least one message to the at least one radio station, the information about the first radio resources being sent by using second radio resources that are allocated to the at least one radio station.

8 Claims, 2 Drawing Sheets

U.S. PATENT DOCUMENTS

| | | | |
|---|---|---|---|
| 2002/0077756 | A1 | 6/2002 | Arouh et al. |
| 2002/0080768 | A1 | 6/2002 | Garcia-Luna-Aceves et al. |
| 2002/0141375 | A1 | 10/2002 | Choi |
| 2002/0176385 | A1* | 11/2002 | Huh et al. ............... 370/335 |
| 2003/0104463 | A1 | 6/2003 | Schuermann et al. |
| 2003/0181213 | A1* | 9/2003 | Sugar et al. ............... 455/454 |
| 2004/0157557 | A1* | 8/2004 | Barnett et al. ............... 455/41.2 |
| 2004/0234508 | A1 | 11/2004 | Schurmann et al. |

FOREIGN PATENT DOCUMENTS

| | | |
|---|---|---|
| WO | WO 02/10453 A2 | 2/2002 |
| WO | WO 02/37102 A2 | 5/2002 |
| WO | WO 02/47007 A2 | 6/2002 |
| WO | WO 03/023642 A2 | 3/2003 |

OTHER PUBLICATIONS

M. Lott et al., "A Frequency Agile Air-Interface for Inter-Vehicle Communication", Proc. ICT, Papeete/Tahiti, Feb. 2003, pp. 507-514.

M. Lott et al.; "Medium Access and Radio Resource Management for Ad hoc Networks based on UTRA TDD", MOBIHOC 2001, Proceedings of The 2001 ACM International Symposium on Mobile Ad Hoc Networking & Computing; Oct. 4-5, 2001; pp. 76-86.

C. Plenge, "The Performance of Medium Access Protocols for Inter-Vehicle Communication Systems", Proceedings ITG-Fachtagung—Mobile Kummunikation, Neu-Ulm, Germany, Sep. 1995, pp. 189-196.

W. Zhu, et al., "DCAP, A Decentral Channel Access Protocol: Performance Analysis"; 41st IEEE Vehicular Technology Conference, St. Louis, MO, 1991, pp. 463-468.

Information Technology—Telecommunications and Information Exchange Between Systems—Local and Metropolitan Area Networks—Specific Requirement. Part 11: Wireless LAN Medium Access Control (MAC) and Physical Layer (PHY) specifications, ISO/IEC 8802-11, IEEE Std 802.11, 2nd Ed., 2005, pp. xvii—xxxviii.

International Search Report for International Application No. PCT/EP2004/0052149; mailed Apr. 15, 2005.

Information Technology—Telecommunications and Information Exchange Between Systems- Local and Metropolitan Area Networks-Specific Requirement, Part 11: Wireless LAN Medium Access Control (MAC) and Physical Layer (PHY)Specification; ANSI/IEEE Std. 802.11, 1999 Ed. (R2003); pp. ix-xiv.

J. J. Binney et al., "The Theory of Critical Phenomena"; Chapter 6: Mean Field Theory; Clarendon Press, Oxford, 1992; pp. 158-177.

D. Hansel et al.; Chapter 13: "Modeling Feature Selectively in Local Cortical Circuits" in C. Koch et al.; Methods of Neural Modeling: From Ions to Networks; MIT Press; Cambridge; 1998; pp. 499-567.

J. W. Lengeler et al., "Kognitive Leistungen und Einzellige Lebewesen", GMB Report 57, Jun. 1999, p. 31.

A. Zell, Simulation Neuronaler Netze, Addson-Wesley Longman Verlag GmbH, 1994 reprinted by R. Oldenbourg Verlag in 2000; pp. 35-114.

* cited by examiner

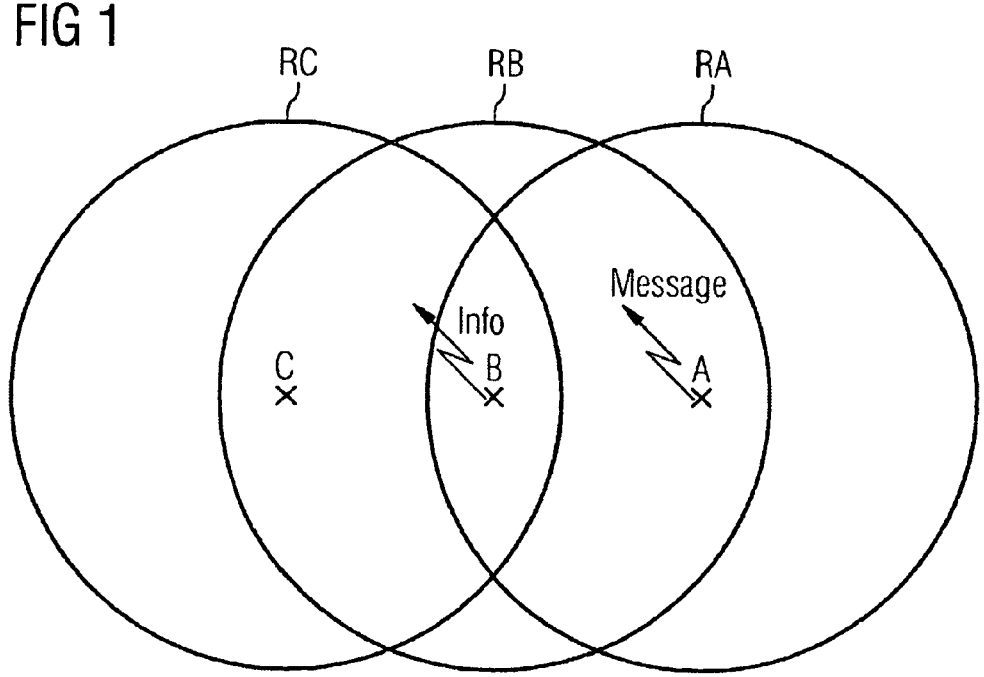

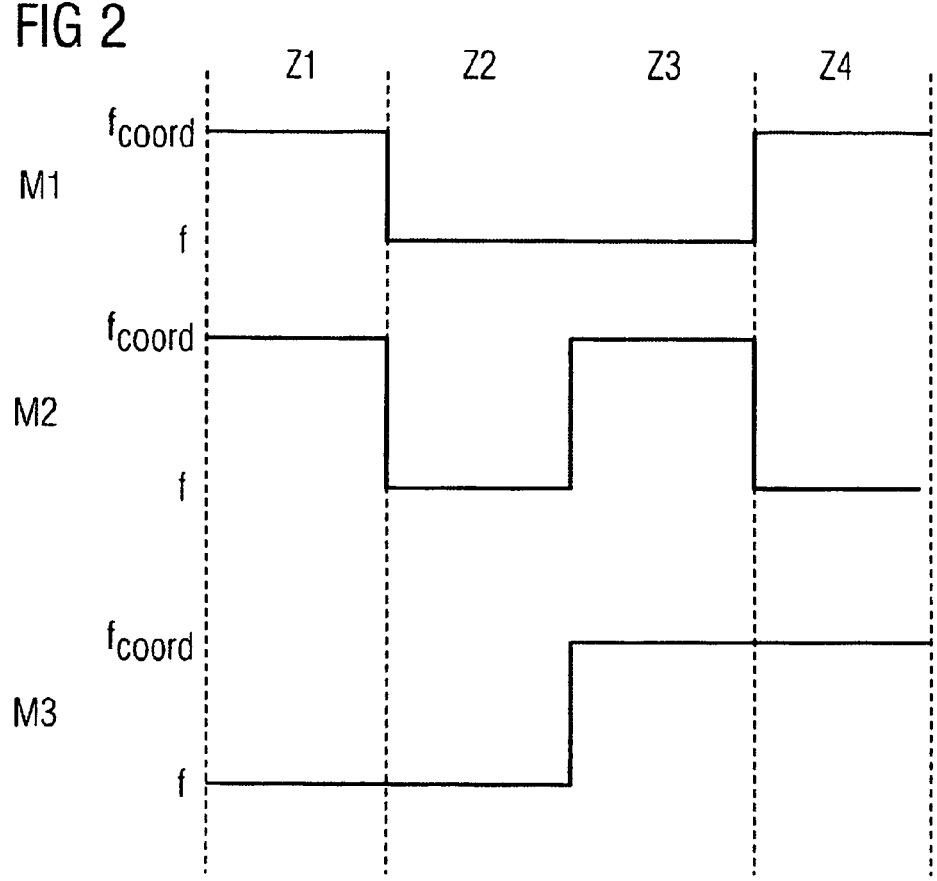
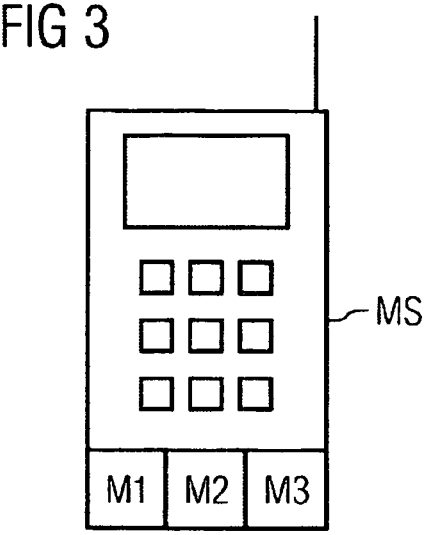

METHOD FOR COMMUNICATING IN AN AD-HOC RADIO COMMUNICATION SYSTEM

CROSS REFERENCE TO RELATED APPLICATIONS

This application is based on and hereby claims priority to German Application No. 10344345.2 filed on Sep. 24, 2003, the contents of which are hereby incorporated by reference.

BACKGROUND OF THE INVENTION

1. Field of the Invention

The invention relates to a method for communicating in a radio communication system. The invention furthermore relates to a radio station for communicating with other radio stations in a radio communication system.

2. Description of the Related Art

In radio communication systems information (for example speech, image information, video information, SMS (Short Message Service), MMS (Multimedia Messaging Service) or other data) is transmitted with the aid of electromagnetic waves between sending and receiving radio station via a radio interface. Depending on the actual embodiment of the radio communication system, the radio stations may in this case include different types of subscriber stations, radio access points or base stations. In such systems the electromagnetic waves are radiated using carrier frequencies that lie within the frequency band provided for the respective system.

In radio communication systems access by radio stations to the common transmission medium is controlled by multiple access/multiplex methods (MA: Multiple Access). With these multiple access methods the radio resources can be shared between the radio stations in the time domain (TDMA: Time Division Multiple Access), in the frequency domain (FDMA: Frequency Division Multiple Access), in the code domain (CDMA: Code Division Multiple Access) or in the space domain (SDMA: Space Division Multiple Access). Combinations of a number of these methods can also be used. Often (for example in GSM (Global System for Mobile Communication), TETRA (Terrestrial Trunked Radio), DECT (Digital European Cordless Telephone), UMTS (Universal Telecommunications System)) the transmission medium is subdivided into frequency and/or time channels. The radio resource is then a timeslot-frequency pair.

Radio communication systems are often embodied as cellular systems, e.g. in accordance with the GSM (Global System for Mobile Communication) or UMTS (Universal Mobile Telecommunications system) standard, having a network infrastructure, for example. of base stations, devices for monitoring and control of the base stations and further network-side devices. Frequencies at 900, 1800 and 1900 MHz are used for the cellular GSM mobile radio system. As well as these cellular, hierarchical radio networks organized on a wide area (supralocal) scale, there are also wireless local networks (WLANs: Wireless Local Area Networks) having, as a rule, a geographically much more limited radio coverage area. With a diameter of up to several hundred meters, the cells covered by the WLAN radio access points (AP: Access Point) are small compared to typical mobile radio cells. Examples of different standards for WLANs are HiperLAN, DECT, IEEE 802.11, Bluetooth and WATM.

In an ad hoc mode of a radio communication system, radio stations transmit messages to one another without the need for these messages to be forwarded by a central piece of equipment such as, say, a radio access point or a base station. In this case the connection between two radio stations is established either directly or, if greater distances are involved, via further radio stations which form relay stations for this connection. The radio stations of a self-organizing network of this type may be mobile radio stations (for example mobile stations of persons or in traffic vehicles) and/or predominantly stationary radio stations (for example computers, printers, household appliances).

Advantages of an ad hoc mode are that communication between radio stations is also possible in areas in which no radio coverage is provided by a network device. Furthermore, as a result of messages being forwarded by radio stations the transmitter power used by the radio stations can be reduced. Finally, with direct communication between equal-ranking radio stations (peer to peer), delays due to the sending of information via a base station are reduced. What is more, since the base station is not involved in the message transmission, network resources are saved.

Whereas with centrally controlled radio access methods radio resources are assigned to radio stations by a hierarchically superior unit such as, for example, a base station, in an ad hoc mode of a radio communication system the radio resources are accessed in a decentralized manner or, to put it another way, radio resources are assigned to radio stations on a decentralized basis. Access to the available radio resources is therefore coordinated on a self-organizing basis in an ad hoc mode. If there is no central equipment which informs the radio stations about the radio resources assigned to them, there is the problem that the radio stations have no knowledge of which radio resources are currently unassigned or, as the case may be, are not allocated to any radio station and so are available for communication purposes. This can lead to a situation in which a plurality of radio stations are using the same radio resources, thereby resulting in packet collisions. Furthermore, due to the lack of information of the radio stations about unassigned radio resources it is possible that a radio station, when sending a message to another radio station, uses a radio resource which the other radio station currently cannot use for receiving the message.

SUMMARY OF THE INVENTION

An object of the invention is to disclose a method for communicating in a radio communication system which avoids the problem of the radio stations' lack of knowledge about the allocation or utilization of radio resources in a non-centrally organized radio access method. A radio station for performing the method is also to be disclosed.

The communication method according to the invention relates to a radio communication system having a plurality of radio stations, wherein messages are sent from radio station to radio station in the radio communication system either directly or via one or more radio stations forwarding the messages using radio resources. For the purpose of sending the messages, radio resources are assigned to radio stations in a decentralized manner. According to the invention at least one radio station sends information relating to the first radio resources used for sending at least one message to the at least one radio station, the sending of the information relating to the first radio resources being effected using second radio resources assigned to the at least one radio station.

In the radio communication system there is no central allocation of radio resources by an entity such as, for example, a base station which makes decisions about the assignment of the radio resources to radio stations for a plurality of messages that are to be sent. Rather, a method for decentralized allocation of radio resources is applied, by which, with the participation of the radio stations, a decision is made concerning which radio station is to be assigned which radio resources for sending messages. Examples of this are different types of ALOHA methods. The decentralized allocation of radio resources is characteristic of an ad hoc mode of a radio communication system. It is possible that further modes of the radio communication system using central assignment of radio resources exist alongside the ad hoc mode. The method for decentralized allocation of radio resources is applied both to the assignment of the first and to the assignment of the second radio resources.

The radio stations can be mobile or stationary subscriber-side radio stations or also radio access points. The method can be used particularly advantageously for a radio communication system in which communication takes place in timeframes subdivided into timeslots. Furthermore the method according to the invention opens up a multiplicity of advantages in a radio communication system in which a plurality of frequency bands are used for sending messages between radio stations.

At least one radio station sends a message whose contents include information relating to the radio resources on which this radio station receives messages. Information relating to the radio resources is therefore not merely contained implicitly in parameters of the message, but is the explicit contents of the message. The message for whose transmission the first radio resources are used is advantageously a message containing useful information (payload). The information about the first radio resources can relate to some of the radio resources on which the respective radio station receives messages or also to all radio resources on which messages are received. The naming of radio resources can include the specification of frequency, time, code or spatial direction, or also any combination of these specifications, possibly in coded form. The messages containing the information relating to the first radio resources are advantageously sent by broadcast, so that all the neighboring radio stations can receive and evaluate the message.

The second radio resources assigned to the at least one radio station are assigned to the latter by way of the decentralized allocation of radio resources according to the ad hoc mode. The second radio resources may be, for example, a dedicated signaling channel or a dedicated channel which is used for the transmission of useful information (payload). The assignment of the second radio resources can be made with the aim of sending the information relating to the first radio resources, so that the radio station will perform a random access to radio resources, e.g. starting from the time at which it learned that a sending of the information relating to the first radio resources was pending, in order to reserve the second radio resources for itself. The second radio resources may, however, also be radio resources which are already assigned to the radio station independently of the sending of the information relating to the first radio resources. The second radio resources are therefore not assigned or linked to the first radio resources relating to which the information is sent, but instead they are assigned to the radio station. This means that the radio station can also use the second radio resources in some other way for sending messages.

In a development of the invention the at least one message for which the first radio resources are used relates to a plurality of messages of different radio stations. The radio station thus provides information not just about radio resources assigned to one radio station, but about radio resources assigned to a plurality of radio stations. In particular, information can be provided about all radio resources which are used for receiving messages of different radio stations.

Because the information about the first radio resources can relate to different numbers of radio stations to which the first radio resources are assigned, a method according to the invention has a high degree of flexibility.

In an advantageous embodiment of the invention the information relating to the first radio resources used for sending a message to the at least one radio station is sent before or after the sending of the message. This can relate to all or else only to some of the messages received or to be received, so that essentially, for example, before or after the reception of any message a radio station can send information about the radio resources used for this, or else with some messages can send information before, and with other messages after, the reception. Sending the information about radio resources to be used in the future for the reception is particularly effective in a radio communication system having a TDMA component.

The sending of information relating to the first radio resources is preferably performed periodically. In this case the content of the sent information can change over time. This is usually the case when there is a change in the composition of the first radio resources. It is also possible that with many transmissions full information relating to all radio resources on which messages have been or are received is provided, whereas with other transmissions only a change to the first radio resources used for reception compared to the last sending of the information relating to the first radio resources is indicated.

In a development of the invention all the radio stations of the radio communication system to which at least one message is sent send information relating to the first radio resources used for sending the at least one message. This rule, according to which all receiving radio stations send information relating to the radio resources used for reception, can possibly be restricted with regard to the type of messages received or to be received. Thus it is possible, for example, that only those radio stations which receive useful information (payload) transmit information relating to the first radio resources which are used for transmitting the useful information. A further possible restriction relates to the type of the first radio resources, so that, for example, a sending of information relating to first radio resources of certain signaling channels can be omitted. A further restriction relates to the type of the radio station from which the message originates. Thus it is possible, for example, that no information relating to the radio resources used is sent with regard to messages which originate from a radio access point.

According to an embodiment of the invention, the information sent in relation to the first radio resources is taken into account in the decentralized assignment of third radio resources to radio stations. In this way radio stations which have received the information relating to the first radio resources store this information and avoid accessing the radio resources when performing their own access to radio resources.

A radio station according to the invention is suitable for communicating with other radio stations in a radio communication system, with messages being sent from radio station to radio station in the radio communication system either directly or via one or more radio stations forwarding the messages using radio resources, and with a decentralized assignment of radio resources to radio stations being performed for the purpose of sending the messages. According to the invention a radio station sends a message containing information relating to the first radio resources used for sending at least one message to the radio station, the message containing information relating to the first radio resources being sent using second radio resources assigned to the radio station.

A radio station according to the invention is suitable for communicating with other radio stations in a radio communication system, with messages being sent from radio station to radio station in the radio communication system either directly or via one or more radio stations forwarding the messages using radio resources, and with a decentralized assignment of radio resources to radio stations being performed for the purpose of sending the messages. According to the invention a radio station receives, from another radio station, a message containing information relating to the first radio resources used for sending at least one message to the other radio station using second radio resources assigned to the other radio station, and in addition takes the received information relating to the first radio resources into account when an assignment of third radio resources to the radio station is initiated on the radio station side.

Radio stations according to the invention are suitable in particular for performing the method according to the invention; the same also applies to the developments and embodiments. For this purpose the radio stations according to the invention can have further suitable means. Advantageous in particular is a radio station having a combination of the features of the two radio stations according to the invention.

BRIEF DESCRIPTION OF THE DRAWINGS

These and other objects and advantages of the present invention will become more apparent and more readily appreciated from the following description of an exemplary embodiment, taken in conjunction with the accompanying drawings of which:

FIG. 1 is a radio coverage diagram for three radio stations,

FIG. 2 is a graph illustrating the use of radio resources in a UTRA-TDD LCR system, and FIG. 3 is a block diagram of a radio station according to the invention.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

The exemplary embodiment concerns a mobile radio communication system having an ad hoc mode in which the mobile stations can communicate directly with one another without the messages exchanged between the mobile stations being forwarded by a network-side device. Access by the mobile stations to the radio resources is handled on a decentralized basis. An example of this is the use of an R-ALOHA method (Reserved ALOHA) for reserving radio resources.

FIG. 1 shows an arrangement of three mobile stations A, B and C with their respective radio coverage areas RA, RB and RC. The mobile station B is located both in the radio coverage area RA of the mobile station A and in the radio coverage area RC of the mobile station C, which means that the mobile stations A and B, as well as the mobile stations B and C, can communicate directly with one another. In contrast hereto, the mobile station C is located outside of the radio coverage area of the mobile station A. Assuming the mobile station A sends a message MESSAGE to the mobile station B, then the correct reception of the message MESSAGE in the mobile station B can be disrupted by the sending of a message by the mobile station C if the mobile station C uses the same radio resource as the mobile station A. Consequently, the mobile station C is a hidden station with respect to the mobile station A. The same problem also exists in the event that the mobile station A is a radio access point of a WLAN.

In order to avoid the sending of a message by the mobile station C on the same radio resource which is used by the mobile station A for sending the message MESSAGE to the mobile station B, the mobile station C requires information indicating that the radio resources used by the mobile station A are not available. One possibility is that those mobile stations which are planning to send a message, send a message indicating the reservation of the radio resources to be used for the planned sending. This does not, however, allow the problem of the hidden stations to be avoided.

According to an aspect of the invention the mobile station B sends a signaling message INFO which indicates on which radio resources it receives a message from the radio station A. The signaling message INFO is transmitted by the mobile station B by broadcast, so all the mobile stations within its radio coverage area RB receive the signaling message INFO. The signaling message INFO can be sent before or after the reception of the message MESSAGE of the radio station A. The mobile station C ascertains from the signaling message INFO of the mobile station B that the corresponding radio resources for a communication within its radio coverage area RC are not available. If the signaling message INFO is sent before the message MESSAGE of the mobile station A is sent, then it is already guaranteed that the message MESSAGE will be received in the mobile station B without its reception being adversely affected by interference signals of the mobile station C. If, on the other hand, the signaling message INFO is sent after the sending of the message MESSAGE of the mobile station A, this is equivalent to a protection of future messages from the mobile station A to the mobile station B against interference signals of the mobile station C.

The mobile station A is assigned the radio resources which it uses for sending the message MESSAGE in accordance with the decentralized radio access method. Similarly, the mobile station B is assigned the radio resources which it uses for sending the message INFO in accordance with the decentralized radio access method. Radio resources for sending the messages MESSAGE and INFO are advantageously assigned in accordance with the same radio access method so that the mobile stations A and B must perform analogous operations to reserve the respective radio resources.

Alternatively or also in addition to the indicating of reserved radio resources by the receiving mobile station, the mobile stations which are interested in reserving radio resources can monitor the respective radio resources and so decide whether these are free or reserved. However, this procedure is disadvantageous in particular when a plurality of frequencies are used for communication. In this case the mobile stations require a plurality of transceivers, i.e. multiple transmitting/receiving devices, each of which operates on one of the frequency channels used. This necessitates an increase in the complexity of the hardware and consequently results in increased costs for the mobile stations.

The radio resources which are indicated in the signaling message INFO can be any combination of, for example, frequency, time, code and spatial direction. The information relating to the radio resources can be transmitted efficiently in coded form, with the result that no great amount of radio resources is required for transmitting the information relating to the radio resources. In contrast to other systems, no complete information is transmitted concerning which radio resources of the entire radio communication system are currently reserved or free. Equally, no details of a planned use of radio resources need to be transmitted through the sending of messages by the sending radio station. Rather, information is sent concerning on which radio resources messages have been received or will be received in the future. In particular no predetermined coupling exists between the radio resource on which messages are received and the radio resource which is used for sending the signaling message INFO. A coupling of this sort is necessary when the signaling message INFO contains no explicit information relating to the radio resources used for the messages received or to be received, but consists solely of implicit information in the form of a mere reception acknowledgement or ready-to-receive message.

The mobile stations which have received the signaling message INFO containing information relating to the radio resources store this information. The reception of a plurality of these signaling messages from different mobile stations ensures the ongoing development of a knowledge base relating to the overall utilization of radio resources within the radio coverage area of a mobile station. When accessing radio resources, the mobile stations take the stored information about reserved radio resources into account by not accessing these radio resources that are stored as reserved.

The signaling message INFO can be broadcast periodically so that the knowledge about the current utilization status is automatically updated even when the network topology changes, i.e. when mobile stations change their position.

All radio resources on which messages of one or more mobile stations are received can be named in the signaling message INFO. However, the method can also be applied using a cumulative information transmission, so that instead of the full set of radio resources used for reception being specified every time a signaling message INFO is sent, only a change compared to the contents of the last signaling message INFO sent is indicated. This reduces the signaling overhead compared to the full transmission. However, in order to ensure that a mobile station can nonetheless protect itself against interference signals of hidden stations due to a network topology that changes over time, the full information should be transmitted at specific time intervals.

The invention can be implemented, for example, as part of an ad hoc mode of a UTRA-TDD (UMTS Terrestrial Radio Access Time Division Duplex) system. This is a system based on timeslots in which a superframe is formed of 4 timeframes, with a timeframe with a length of 10 ms being subdivided into 15 timeslots. Up to 16 codes can be used in each of the timeslots. Thus, 960 units of radio resources are available per superframe. According to a decentralized assignment of radio resources to the mobile stations, the mobile stations can reserve a timeslot of a superframe for themselves as a CSBC (Circuit Switched Broadcast Connection), which timeslot is then available to them every 40 ms.

The reservation is made as follows: the mobile stations that are interested in making a reservation monitor the timeslots and access a timeslot which they have identified as being unreserved. In the message with which the mobile stations access a timeslot it is indicated to which recipients it is planned to send messages in the corresponding timeslot or timeslots of the next superframe.

The completed reservation of a timeslot or a timeslot/code combination is maintained according to the R-ALOHA method as a result of the fact that the other mobile stations recognize, by monitoring the radio traffic during the timeslots, that the timeslot in question is being used and respect this use for following superframes also by not accessing the reserved timeslots. The reservation then holds for each superframe for as long as the reserved radio resources are required.

In order to disseminate the knowledge about currently reserved or, as the case may be, available radio resources, each mobile station which receives messages from one or more other mobile stations broadcasts a reservation table within its CSBC, the reservation table containing the timeslots in which the mobile station has received or will receive messages. This notification can refer to messages that are to be received in the future, since it is known to the mobile stations on account of the contents of the access message that the sending of the corresponding message is planned. If a mobile station has so far not reserved a CSBC, it attempts to reserve such a connection in order to be able to broadcast the reservation table within its CSBC.

In the sending of reservation tables by the recipient of the respective messages it reveals itself as advantageous that the signaling overhead resulting herefrom is small compared to the sending of complete reservation tables containing information relating to all the reserved radio resources. Owing to the reservation tables of all neighboring mobile stations being received, over time the complete reservation information on all radio resources within their radio coverage area is built up for the mobile stations. The sent reservation tables also serve as confirmation that a mobile station is ready to receive messages from another mobile station: if the mobile station A reserves a timeslot for transmitting messages to the mobile station B, and if the reservation table of the mobile station B does not include the corresponding timeslot reserved by the mobile station A, then the mobile station B is not ready to receive a message in the respective timeslot. In this case the mobile station A should forego sending the message to the mobile station B in the timeslot in question.

The alternative, whereby the reservation table is sent, not by the recipient, but the sender of a message, would not have this positive effect of confirming a completed reservation or, as the case may be, the ready-to-receive status. Rather, such a sending of a reservation table by the sender would be equivalent to a repetition of information that has already been sent. This repetition would have only a limited effect, since by this procedure a multiple reservation of radio resources for the sending of a message to the same mobile station by different senders cannot be ruled out in the case of hidden stations.

Furthermore, the sending of the reservation table by the recipient has the advantage that other mobile stations wanting to reserve a timeslot for the purpose of sending a message to a recipient from which they have received a reservation table ascertain, from the evaluation of the reservation table, within which timeslots the recipient is ready to receive.

In addition, the reservation tables also indicate to the other mobile stations when radio resources of a mobile station which has used these previously are no longer required or have been released. Thus, a release message by the radio station reserving the radio resources can be dispensed in certain circumstances. In the event that a release message is sent, a hidden station cannot receive the message, with the result that it benefits from the information of the reservation table with respect to the release of the radio resources.

A further possibility for implementing the invention exists within the framework of an ad hoc mode of the LCR (Low Chip Rate) variant of UTRA-TDD. In this case a superframe is subdivided into four timeframes of 14 timeslots each. Up to 16 codes can be used per timeslot. In addition an FDMA component is introduced by dividing up the entire frequency bandwidth of 5 MHz into three frequency bands. In this way 2688 units of radio resources are available, with information about their utilization status being sent in reservation tables by the recipients of messages. Compared with the above-described UTRA-TDD system, the introduction of the FDMA component means an increase in complexity in terms of the decentralized assignment of radio resources.

FIG. 2 shows, plotted to the right, the four timeframes Z1, Z2, Z3 and Z4 of a superframe. Three different switchover patterns M1, M2 and M3 exist. The mobile stations are subdivided into three groups which are assigned to the three switchover patterns M1, M2 and M3. In each of the four timeframes Z1, Z2, Z3 and Z4 there exists for each switchover pattern the possibility of communication either on a specified coordination frequency $f_{coord}$ or on the remaining frequencies f that are not used for coordination. In the first timeframe Z1, the first switchover pattern M1 uses the coordination frequency $f_{coord}$, in the second and third timeframes Z2 and Z3, the frequencies f in each case not used for coordination, and in the fourth timeframe, once again the coordination frequency $f_{coord}$. The second switchover pattern M2 uses the coordination frequency $f_{coord}$ in the first and in the third timeframe Z1 and Z3, while the third switchover pattern M3 uses the coordination frequency $f_{coord}$ in the third and fourth timeframes Z3 and Z4. A use of the coordination frequency $f_{coord}$ common to several switchover patterns thus takes place in the first timeframe Z1 by the first and the second switchover patterns M1 and M2, in the third timeframe Z3 by the second and the third switchover patterns M2 and M3, and in the fourth timeframe Z4 by the first and the third switchover patterns M1 and M3. During the second timeframe Z2, all the switchover patterns M1, M2 and M3 use all three frequencies, which means that no frequency is used for coordination purposes in the second timeframe Z2.

The timeframes within which the switchover patterns M1, M2 and M3 use the coordination frequency $f_{coord}$ are referred to as the ET phase (Exchange Phase) of the respective switchover pattern M1, M2 and M3. For the first switchover pattern M1, the ET phase is thus situated in the first and the fourth timeframe Z1 and Z4, for the second switchover pattern M2, in the first and the third timeframe Z1 and Z3, and for the third switchover pattern M3, in the third and the fourth timeframe Z3 and Z4. The respective other timeframes are referred to as the AT (Arbitrary Transmission) phase. During the ET phase for reserving radio resources of the AT phases and for exchanging other signaling messages, the AT phase serves for sending messages on reserved radio resources.

In order to ensure that mobile stations which are assigned to different switchover patterns M1, M2 and M3 can exchange signaling messages with one another, each mobile station has available to it one CSBC per ET phase, i.e. therefore a total of two CSBCs within a superframe. These CSBCs are distributed among the communicating mobile stations, or the mobile stations interested in a communication, according to a decentralized access method.

A reservation of radio resources of the AT phases is made by decentralized access to the radio medium within the CSBCs of the ET phases. As far as the other mobile stations are concerned, these radio resources of the AT phases are regarded as reserved according to the principles of R-ALOHA. This means that the other mobile stations do not attempt to make a reservation of the respective radio resources as long as they consider these to be reserved. The decision on whether radio resources are to be considered as reserved can be taken on the basis of the observation of the reservation messages within the ET phases or else by monitoring of the radio traffic of the respective radio resources during the AT phases.

The reservation tables are sent by the recipients of messages within the CSBCs during the ET phases. Thus, for example, a mobile station of the first switchover pattern M1 is informed about the reservation tables of the mobile stations of the first and second switchover patterns M1 and M2 during the first timeframe Z1, and about the reservation tables of the mobile stations of the first and third switchover patterns M1 and M3 during the fourth timeframe Z4. Consequently, for mobile stations which observe the coordination frequency $f_{coord}$, there results over time a complete overview of which radio resources are currently being used or, as the case may be, are available.

As the ET phases of mobile stations of different switchover patterns occur at different times there is the risk that mobile stations of different switchover patterns reserve identical radio resources of the AT phases for themselves because under certain conditions they may not mutually receive their respective reservation signals. This risk can be avoided by the sending of reservation tables according to the invention. If, for example, a mobile station A of the third switchover group M3 reserves radio resources of the second timeframe Z2 in the third timeframe Z3 for the purpose of sending a message to a mobile station B of the second switchover group M2, then in the first timeframe Z1 of the next superframe the mobile station B broadcasts a reservation table containing information relating to these reserved radio resources of the second timeframe Z2. A further mobile station C of the first switchover group Ml which also wants to reserve radio resources of the second timeframe Z2 for the purpose of sending a message to the mobile station B receives the reservation table of the mobile station B and takes the reservation of radio resources by the mobile station A into account in its own reservation of radio resources in order to avoid overlaps. Thus, the mobile station C can attempt to reserve radio resources on the same frequency on which the message is sent by the mobile station A, with the result that no switchover between two reception frequencies is necessary for the mobile station B.

FIG. 3 shows a mobile station MS according to the invention having means M1 for sending a message containing information about radio resources which are used for sending messages to the mobile station MS. In this case the message containing the information relating to the radio resources is sent on radio resources which are assigned to the mobile station MS on the basis of a decentralized access method. The means M1 are therefore used by the mobile station MS when it is the recipient of messages. A further component of the mobile station MS are the means M2 for receiving such a message from another mobile station and the means M3 for taking the received information relating to the radio resources into account when performing its own access to radio resources. The means M2 and M3 are therefore relevant to the mobile station when mobile stations which receive information from other mobile stations are located within its radio coverage area.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. A method for communicating in a radio communication system formed of radio stations, comprising:
sending messages between at least some of the radio stations either directly or via at least one forwarding radio station;
broadcasting, from at least one first radio station, information relating to first radio resources used exclusively for sending at least one message from one or more radio stations other than the first radio station to the at least one first radio station, said broadcasting of the information being effected using second radio resources assigned to the at least one first radio station; and performing decentralized assignment of the first and second radio resources to the radio stations for said sending of the at least one message and the information using the first and second radio resources, respectively, according to a single decentralized radio access method for both the first and second radio resources.

2. The method as claimed in claim 1, wherein the at least one message includes a plurality of messages sent by a plurality of the radio stations.

3. The method as claimed in claim 1, wherein the information relating to the first radio resources is sent either before or after the at least one message is sent.

4. The method as claimed in claim 1, wherein the information relating to the first radio resources is sent repeatedly.

5. The method as claimed in claim 1, wherein all the radio stations of the radio communication system to which at least one message is sent send information relating to the first radio resources used for sending the at least one message.

6. The method as claimed in claim 1, wherein said performing of the decentralized assignment further assigns third radio resources to the radio stations taking into account the information sent relating to the first radio resources.

7. A radio station for communicating with other radio stations in a radio communication system either directly or via at least one forwarding radio station, comprising:

a communication section broadcasting information relating to first radio resources used exclusively for sending at least one message from one or more of the other radio stations to said radio station, the information being broadcast using second radio resources assigned to said radio station, both the first and second radio resources assigned using a single decentralized radio access method.

8. A radio station for communicating with other radio stations in a radio communication system either directly or via at least one forwarding radio station, comprising:

means for receiving, from another radio station, broadcast information relating to first radio resources used for sending at least one message from said radio station to the other radio station, the information broadcast using second radio resources assigned to the other radio station, both the first and second radio resources being assigned using a single decentralized radio access method; and means for assigning third radio resources to said radio station taking into account the information relating to the first radio resources when assignment of third radio resources is initiated by said radio station.

\* \* \* \* \*